US008849476B2

(12) United States Patent
Coulmeau

(10) Patent No.: US 8,849,476 B2
(45) Date of Patent: Sep. 30, 2014

(54) METHOD OF CREATING AND UPDATING AN ATC FLIGHT PLAN IN REAL TIME TO TAKE ACCOUNT OF FLIGHT DIRECTIVES AND IMPLEMENTATION DEVICE

(75) Inventor: François Coulmeau, Seilh (FR)

(73) Assignee: Thales, Neuilly-sur-Seine (FR)

( * ) Notice: Subject to any disclaimer, the term of this patent is extended or adjusted under 35 U.S.C. 154(b) by 1771 days.

(21) Appl. No.: 11/957,202

(22) Filed: Dec. 14, 2007

(65) Prior Publication Data

US 2008/0154486 A1 Jun. 26, 2008

(30) Foreign Application Priority Data

Dec. 15, 2006 (FR) ..................................... 06 10953

(51) Int. Cl.

| | |
|---|---|
| ***G08G 1/123*** | (2006.01) |
| ***G06F 17/00*** | (2006.01) |
| ***G05D 3/00*** | (2006.01) |
| ***G08G 5/00*** | (2006.01) |

(52) U.S. Cl.

CPC ............ *G08G 5/0039* (2013.01); *G08G 5/0034* (2013.01); *G08G 5/0013* (2013.01)

USPC ............ 701/14; 701/1; 701/3; 701/4; 701/15; 701/16; 701/400; 701/410; 701/411; 701/413; 340/3.1; 340/13.24; 340/945; 340/994; 244/3.1; 244/75.1; 244/76 R

(58) Field of Classification Search

USPC .................. 701/1, 3, 4, 11, 14–16, 200–202, 701/209–211, 400, 410, 411, 413; 340/3.1, 340/13.24, 945, 994; 244/3.01, 75.1, 76

See application file for complete search history.

(56) References Cited

U.S. PATENT DOCUMENTS

| | | | | |
|---|---|---|---|---|
| 4,642,775 | A * | 2/1987 | Cline et al. | 701/528 |
| 5,351,194 | A | 9/1994 | Ross et al. | |
| 5,916,297 | A * | 6/1999 | Griffin et al. | 701/120 |
| 6,163,744 | A * | 12/2000 | Onken et al. | 701/3 |
| 6,313,759 | B1 * | 11/2001 | Musland-Sipper | 340/945 |
| 6,522,958 | B1 * | 2/2003 | Dwyer et al. | 701/3 |
| 2005/0049762 | A1 * | 3/2005 | Dwyer | 701/3 |
| 2005/0203676 | A1 * | 9/2005 | Sandell et al. | 701/3 |
| 2005/0283281 | A1 * | 12/2005 | Hartmann et al. | 701/4 |
| 2007/0219678 | A1 * | 9/2007 | Coulmeau | 701/3 |
| 2009/0055035 | A1 * | 2/2009 | Caillaud | 701/5 |
| 2010/0030401 | A1 * | 2/2010 | Rogers et al. | 701/3 |

FOREIGN PATENT DOCUMENTS

| | | | | |
|---|---|---|---|---|
| WO | 02/30007 A1 | | 4/2002 | |
| WO | WO-2005045785 A1 | * | 5/2005 | G01C 23/00 |
| WO | 2005062859 A2 | | 7/2005 | |
| WO | 2006040249 A1 | | 4/2006 | |

* cited by examiner

*Primary Examiner* — Jack W Keith
*Assistant Examiner* — Chuong P Nguyen
(74) *Attorney, Agent, or Firm* — Lowe Hauptman & Ham, LLP

(57) ABSTRACT

The present invention relates to a method of updating an ATC flight plan of an aircraft in real time to take account of the flight directives. A reference flight plan is designated. In tandem with the receipt of the flight directive messages originating from the ground, then verifying validity of the flight directive messages, if the message is validated in the affirmative, the messages are applied successively to the reference flight plan and stored. Managing, in real time, the complete list of these flight directives and the ATC flight plan.

4 Claims, 4 Drawing Sheets

METHOD OF CREATING AND UPDATING AN ATC FLIGHT PLAN IN REAL TIME TO TAKE ACCOUNT OF FLIGHT DIRECTIVES AND IMPLEMENTATION DEVICE

RELATED APPLICATIONS

The present application is based on, and claims priority from, French Application Number 06 10953, filed Dec. 15, 2006, the disclosure of which is hereby incorporated by reference herein in its entirety.

FIELD OF THE INVENTION

The present invention pertains to a method of creating and updating an ATC flight plan in real time to take account of flight directives, as well as to a device for implementing this method.

BACKGROUND OF THE INVENTION

The invention lies in the field of flight management systems (termed "FMS") and ATC ("Air Traffic Control", that is to say air traffic management) communications between aircraft and management control stations on the ground.

The growing proportion of automation over the last twenty-five years in avionics, both civil and military, is leading aircraft crews ever more to perform "monitoring" tasks in regard to electronic systems, and ever less to directly influence the primary piloting controls of aircraft.

This trend has become accentuated over the last fifteen years with the generalization of onboard flight management systems (FMS).

These systems concentrate a large amount of data:

- arising from sensors (GPS, VHF) for navigation,
- arising from databases (navigation databases) for formulating the electronic flight plan,
- arising from performance databases for formulating the predictions along the flight plan,
- arising from manual inputs on the part of the crew (in general for initializing the calculations) or automatic inputs by "datalink" (ground-air digital data link) coming from the airline or air traffic control centers (ATC).

Among the pilot's tasks, the management of the flight directives received from the ATC, subsequently dubbed "clearances", occupies a very significant proportion of the job. The clearances coming from the ground can be taken into account on board in two ways:

- either directly, via the flight controls or the automatic pilot,
- or via a flight management computer (FMS). In the latter case, according to the current state of the art, the pilot manually modifies his flight plan so as to take account of a clearance originating from the ground.

This way of proceeding may potentially generate problems of oversights and confusion. Moreover, when the crew, having accepted a certain number of clearances from the ground, and modified the flight plan accordingly, receives a clearance to cancel one of the directives, it is almost impossible for the crew to actually remove this clearance from the flight plan.

In a more automated ATM framework, this is prohibitive in respect of both safety and operational use of the possibilities offered by the datalink. The pilot cannot reverse his flight plan (no multiple "UNDO") if the latest clearances received and loaded for testing into his FMS are not suitable for him, and he cannot cancel an intermediate instruction either.

SUMMARY OF THE INVENTION

The object of the present invention is a method of updating an ATC flight plan in real time to take account of flight directives, which method monopolizes the pilot as little as possible and enables cancelled clearances to be removed from the flight plan.

The method in accordance with the invention is characterized in that it consists:

- in designating a reference flight plan,
- in tandem with the receipt of the messages originating from the ground, in verifying their validity, and in the affirmative, in applying them to the reference flight plan and in storing them,
- in managing in real time the complete list of these flight directives and the ATC flight plan.

According to a characteristic of the invention, in the initial state, before the receipt of the first flight directive, the aircraft's flight management system uses the existing active flight plan which is the reference ATC flight plan (version v0) and stores a secondary flight plan which is devoid of any flight directive.

According to another characteristic of the invention, when a directive received is deemed valid, the active flight plan updated by this directive is loaded into the ATC flight plan which is dispatched cyclically to the ground.

According to yet another characteristic of the invention, during the cancellation by the pilot or on receipt of a clearance to cancel at least one clearance previously received and recognized as valid, the flight management system returns to the initial state, the reference ATC flight plan is successively updated with all the flight directives deemed valid, and the list of received flight directives is updated.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The method of the invention consists in processing in an internal and transparent manner a stack of flight plans corresponding to clearances, it being possible for the latter to be mixed, cancelled, either in an interactive manner, or semi-automatically, by acknowledging or rejecting messages arising from the CMU ("Communication Management Unit", that is to say Communications Supervision Unit).

Thus, the method of the invention solves the following problems:

limitation of the number of messages exchanged, impossibility of returning to one or more clearances when they have been loaded by the pilot for verification purposes, and then cancelled, impossibility of actually cancelling an arbitrary clearance from among the N received.

Another significant advantage of the method of the invention is that it makes it possible to manage systems of drones (aircraft with no pilot aboard). These craft are in fact piloted from the ground station by dispatching directives in the form of a mini flight plan; direct "teleguidance" (aeromodelling) is impossible for these systems. The only way to take account of ATC clearances is therefore for them to modify the flight plan accordingly.

Figure 1:
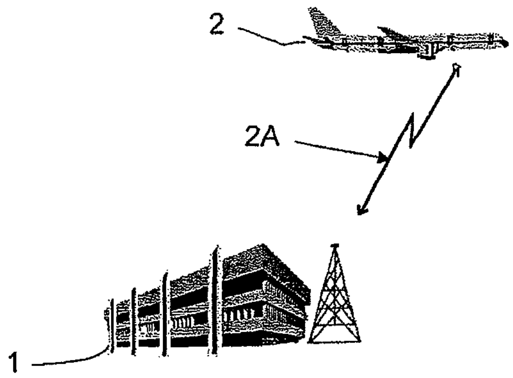
FIG. 1 is a simplified view of an ATC center communicating with an aircraft via a datalink link.

The diagram of FIG. 1 serves to illustrate the operational use of clearances by ATC datalink, with the parties involved.

The air traffic control ground station 1, in communication with the aircraft 2 by datalink 2A, dispatches the digital clearances ("ATC CPDLC Uplink", for "Controller to Pilot Data Link Communication") using standardized messages (termed "ATC Uplinks", whose structure is codified in the RTCA DO-219 standard for current operation, or OACI SARPS ATN standard for future implementations, the two being much the same). The clearances are received by the communication equipment ("CMU" for "Communication Management Unit"), and viewable on the dedicated graphics interface (an example of such an interface is described below with reference to FIG. 4).

The pilot can then decide to load these clearances into the flight plan or else to refuse them. If he decides to take account of them, he can load them from the CMU to the flight management computer (FMS). This computer holds the structure of the flight plan and the associated predictions. In general it stores a flight plan dedicated to the ATC communications (called the "ATC flight plan" hereinafter). The FMS processes the message, verifies its acceptability, and modifies the ATC flight plan if the message is valid. Otherwise it rejects the message to the CMU, enabling the pilot to send the rejection back to the ground. Several clearances may arrive consecutively or at the same time and be processed in accordance with the invention.

Once the flight plan has been validated, the pilot can load it into his active flight plan (that is to say the flight plan to which the aircraft is slaved and which is communicated to the ATC station).

In return, in monitoring applications, the FMS can send its active flight plan back to the ground by ADS (in the same manner as currently), ADS being the acronym for "Automatic Dependent Surveillance", which is an automatic system for exchanging position and movement information between aircraft deploying in close vicinity to one another or between an aircraft and a ground control station, for the static and dynamic parts (predictions of altitude, speed, arrival time, etc.).

Figure 2:
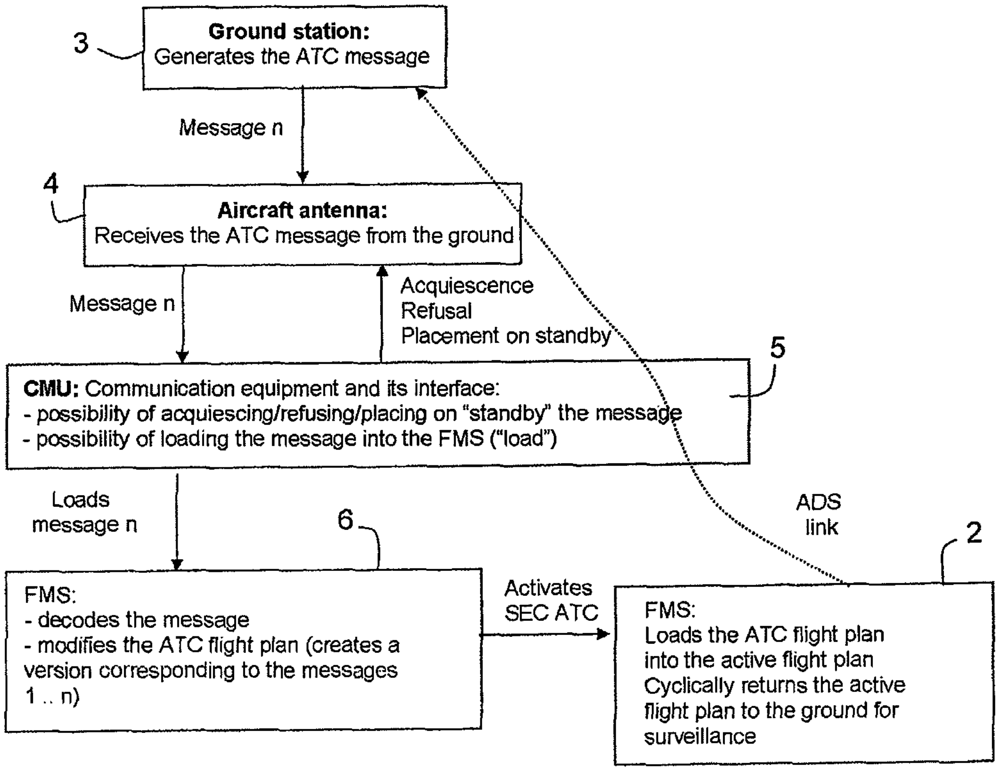
FIG. 2 is a simplified diagram illustrating the data exchanges, and in particular the dispatching of clearances by the ATC center of FIG. 1 to the aircraft of this same figure and the corresponding management of the flight plans, in accordance with the present invention.

The diagram of FIG. 2 summarizes the actions in question.

In the first step, referenced 3, the ground control station 1 generates an ATC message (message of rank n). The antenna of the aircraft 2 receives this message (4) and transmits it in a usual manner to the CMU. By virtue of the interface with which the CMU is furnished, the pilot can proceed (5) to one of the following actions and keep the ATC informed thereof:

he accepts this message ("WILCO" or "ROGER" button for example) or refuses it ("UNABLE" button for example) or places it on hold ("standby" button for example), and, on the other hand, he can load this message into the memory of the FMS ("load" action).

In the latter case, the FMS (6) decodes the message received and modifies the current ATC flight plan, that is to say it creates a version vn corresponding to the n messages that are received from the ATC center and are uncancelled. The pilot can then activate a secondary ATC flight plan ("SEC ATC") corresponding to the version vn of the ATC flight plan, and at the same time the FMS (7) loads the ATC flight plan of version vn into the active flight plan and communicates this active flight plan by datalink link to the ATC center so that the latter can monitor compliance with this flight plan by the aircraft 2.

According to the method of the invention, the list of digital ATC clearances which have been accepted by the pilot is stored in the FMS. Preferably, it is considered that there is no manual modification of the ATC flight plan, the latter being intended to be communicated to the ATC. Likewise, the "reference ATC flight plan", which is the version of the ATC flight plan just before the first clearance, is stored in the FMS. The "current ATC flight plan" will therefore be "the reference ATC flight plan" ("version zero flight plan") to which are applied the N clearances accepted and loaded by the pilot from the CMU to the FMS. It is this current ATC flight plan which will be viewable on the interfaces of the pilot of the FMS, just like the secondary ATC flight plan. On these same interfaces will be seen the clearances associated with the flight plan, in list form, with the possibility of the pilot activating/deactivating one of the clearances by ticking/unticking a box, to verify the flight plan and its predictions.

Figure 3:
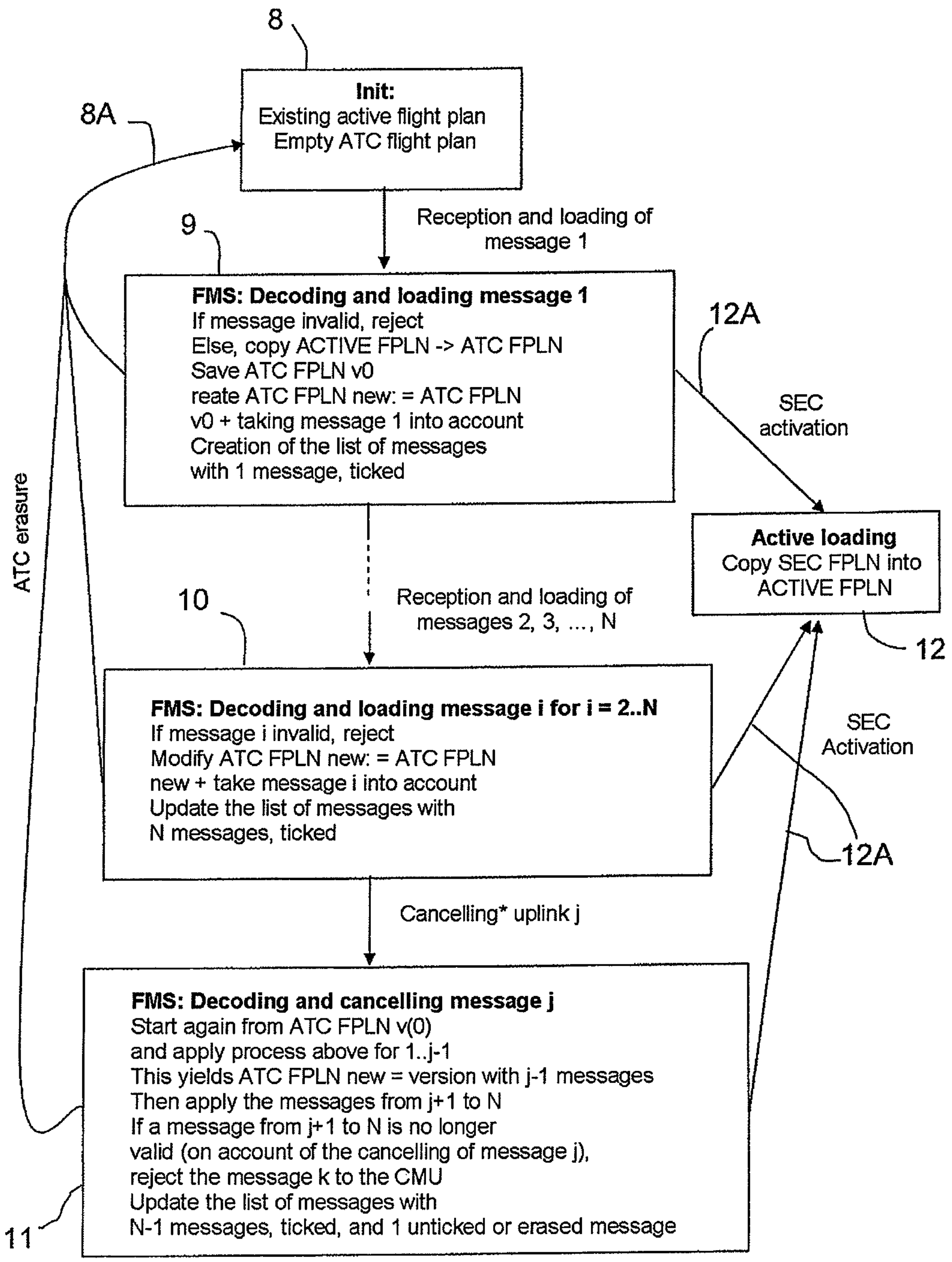
FIG. 3 is a diagram illustrating the various steps of the program for managing the clearances and flight plans executed aboard the aircraft receiving clearances from the ATC center of FIG. 1, in accordance with the present invention.

The successive steps of the method of the invention can be modelled in the manner illustrated in FIG. 3. At an instant t, for example just before takeoff, in the initial state "INIT" of the program of the method (8), the aircraft 2 uses the existing active flight plan (termed the reference ATC flight plan, version v0) and stores in its memory a secondary flight plan ("SEC ATC") which is devoid of any clearance (reference ATC flight plan). On receipt of the first clearance (here called "Uplink 1"), the FMS proceeds (9) to the decoding thereof and to the loading thereof into its own memory. If this clearance is deemed invalid by the FMS, it is rejected, and the pilot is immediately warned thereof by display of this information on the CMU. The pilot can then respond to the ATC station and manually process this clearance. On the other hand, if this first clearance is recognized as valid, the FMS orders the active flight plan to be copied into the ATC flight plan while saving the version v0 ATC flight plan. Specifically, the ATC flight plan (which initially contains the version v0) will be modified by the first clearance received. It is therefore necessary to save the flight plan v0 to prevent it from being lost. Furthermore, the FMS creates a new flight plan (version v1) resulting from the updating with the first clearance ("Uplink 1") of the reference ATC flight plan (of version v0) and it creates a list of clearances, now comprising a message, the corresponding box of the display (see FIG. 4) being ticked, thus signifying that this first message has been taken into account.

In tandem with the arrival of the clearances of rank i=2, 3, . . . N, this process is repeated, this having been symbolized in FIG. 3 by the block 10 for a clearance of rank i=N, that is to say if the clearance of rank N is deemed invalid, it is rejected, otherwise the new ATC flight plan (version vN)

corresponds to the active flight plan just before the arrival of this clearance N (version vN−1), updated with this clearance. Moreover, the list of clearances then comprises N messages whose boxes are all ticked.

Furthermore represented in FIG. 3 is a block 11 illustrating the case where a clearance of rank j (j<N) is cancelled. The cancellation of the clearance j can be ordered either on receipt of a clearance of rank N of the type "Disregard j" (reject clearance j), or manually by the pilot by unticking the box corresponding to the message j on his graphics interface (see an example in FIG. 4). The list of messages is updated automatically. This clearance j is then considered invalid after decoding by the FMS and is therefore rejected, while the following clearances of ranks j+1 to N have been deemed valid. This results in the following actions: the FMS reverts to the version v0 flight plan to which it applies the process set forth above with reference to the blocks 9 and 10, doing so, successively for i=1 to j−1, then for i=j+1 to N. If, among the clearances of ranks j+1 to N, a clearance, for example that of rank k, is no longer recognized as valid by the FMS (because of the cancellation of clearance j), this clearance k is rejected and dispatched to the CMU to be signalled to the pilot. Finally, the list of clearances is updated, and it then comprises N messages of which N−1 are ticked and one (that of clearance j) is unticked or erased.

At each of steps 9, 10 and 11, the erasure of the current ATC flight plan (as a consequence of the rejection of a clearance) entails initializing the program for managing the clearances and flight plans (arrow 8A), that is to say this program returns to step 8. Likewise, at each of these steps 9,10 and 11, there is loading of the secondary flight plan (arrows 12A) into the active flight plan (12) if there is activation by the pilot of this secondary flight plan, or if the pilot accepts the clearance on his CMU ("WILCO" or "ROGER" action for example).

It will be noted that the erasure of the ATC flight plan brings the program back to the state INIT 8.

Figure 4:
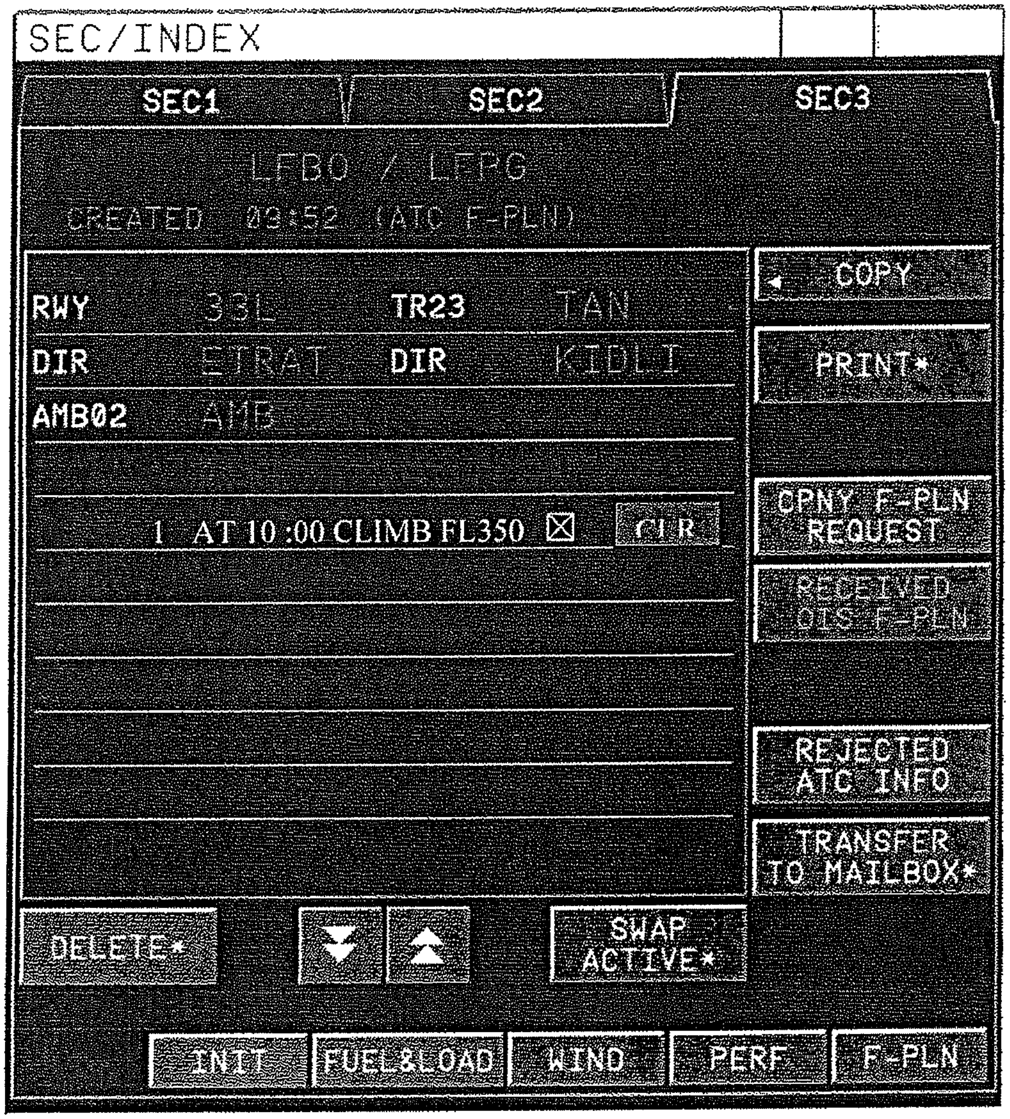
FIG. 4 is a view of an exemplary man-machine interface screen implementing the method of the invention.

Represented in FIG. 4 is a view of an exemplary FMS graphics interface displaying substantially at its center a line comprising a message "AT 10:00 CLIMB FL350", this message being preceded by the number 1, signifying that it is the first clearance received by the aircraft. This message is followed by a small square box which is ticked with a small cross such as represented in the figure, thereby signifying that this message has been taken into account by the pilot. The line of this message terminates with an associated erasure button (marked "CLEAR"). The other elements visible in FIG. 4 are those usually displayed on an FMS graphics interface, and will not be described here.

The clearances of the ATC flight plan can be "unticked" (by "clicking" on the cross of the square box following the message displayed on the graphics interface) but can be erased separately (by clicking on the "CLEAR" button) for example for each clearance message, or else can also all be erased simultaneously by clicking on a "CLEAR ALL" button (not represented in the drawing).

Of course, according to another characteristic of the invention, the method can be extended to direct modifications in the active flight plan, without going via an ATC flight plan.

Likewise the method can be applied to any type of instruction message, coming either from the airline ("datalink AOC" messages) or from the airport (taxiing messages ("TAXI clearances").

Figure 5:
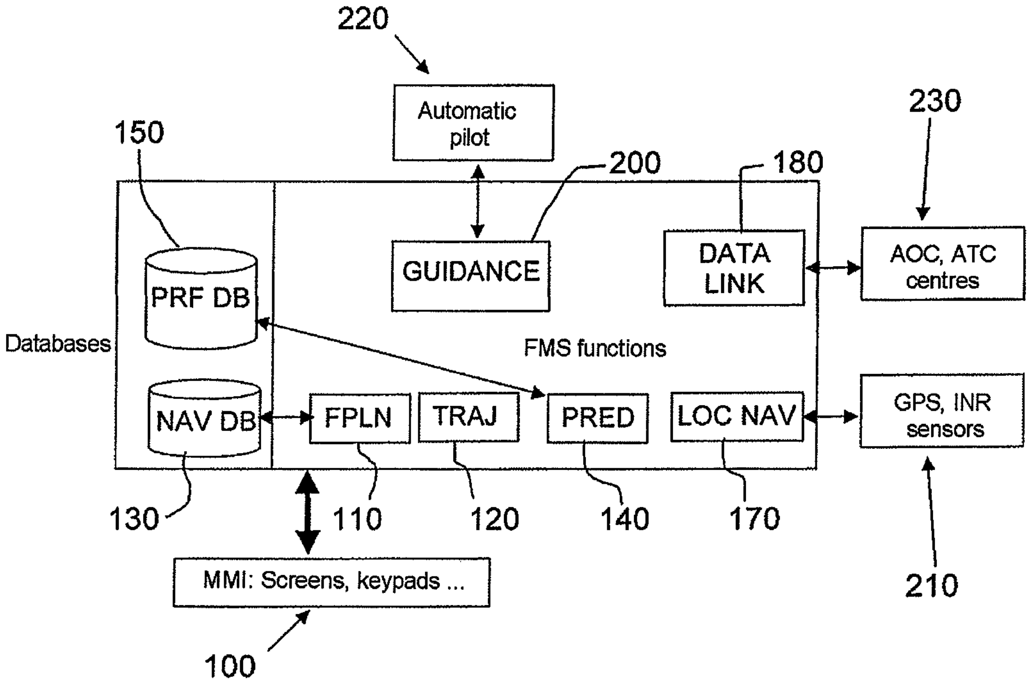
FIG. 5 is a block diagram of an exemplary device for implementing the method of the invention.

Represented in the simplified block diagram of an aircraft conventional flight management device (termed FMS) of FIG. 5, which is fitted with a man-machine interface MMI 100 are the following functions of the FMS, described in the ARINC 702 standard (Advanced Flight Management Computer System, December 1996). They normally ensure all or some of the functions of:

- Navigation LOCNAV, referenced 170, to perform optimal location of the aircraft as a function of the available geo-locating means (GPS, GALILEO, VHF radio beacons, inertial platforms, referenced 210 as a whole),
- Flight plan FPLN, referenced 110, to input the geographical elements constituting the skeleton of the route to be followed, namely: departure and arrival procedures, waypoints, airways,
- Navigation database NAV DB, referenced 130, to construct geographical routes and procedures using data included in the bases (points, beacons, interception or altitude "legs", etc.,
- Performance database PRF DB, referenced 150, containing the aerodynamic parameters and those of the engines of the craft,
- lateral trajectory construction function TRAJ, referenced 120, to construct a continuous trajectory on the basis of the points of the flight plan, complying with the performance of the aircraft and the confinement constraints (RNP);
- Prediction function PRED, referenced 140, to construct a vertical profile optimized on the lateral trajectory,
- Guidance, ("GUIDANCE"), referenced 200, to guide in the lateral and vertical planes the aircraft on its 3D trajectory, while optimizing the speed, in conjunction with the automatic pilot 220,
- Digital data link "DATALINK", referenced 180, to communicate with the control centers and the other aircraft, referenced 230.

The method of the invention implements only elements of the FMS. In the FMS device described above, the clearances originate from outside, namely from the AOC, ATC centers referenced 230. The "Datalink" component 180 analyses the format of the clearances and rejects them or accepts them based on purely syntactic, protocol or size criteria. The accepted clearances are transmitted by the Datalink component 180 to the FPLN component 110. The FPLN component is in charge of the reference flight plan and the ATC flight plan. The FPLN component analyses the clearances by calling upon the database NavDB 130 to test the validities of the flight plan elements of the clearance, and upon the components TRAJ 120 and PRED 140 for the clearances which call upon parameters of type (Altitude, speed, heading, time). The MMI component 100 manages the display of the list of clearances (see the example of FIG. 4), and the depressions of the pilot-actuatable buttons.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A method of updating an air traffic control flight plan of an aircraft in real time to take account of flight directives of rank i, 1≤i≤N, which are successively loaded in a flight management system, said flight directives having two possible states, one state being "loaded and valid" and the other one being "loaded and invalid then cancelled", said method comprising the following steps:

designating a reference air traffic control flight plan which is equal to an existing active flight plan, at the instant where the active flight plan is loaded in the flight management system in order to create the reference air traffic control flight plan;

saving the reference air traffic control flight plan in the flight management system;

upgrading the reference air traffic control flight plan, when the flight directive of rank 1 is loaded in the flight management system by creating a new air traffic control flight plan version 1, resulting from the updating of the reference air traffic control flight plan with said flight directive of rank 1;

saving the air traffic control flight plan version 1 in the flight management system;

creating and displaying on a graphic interface of the flight management system a list of loaded flight directives that include a first loaded flight directive, said list loaded flight directives indicating the corresponding state "loaded and valid" for said loaded flight directive;

successively repeating the following steps upon receiving the flight directives of rank i=2, 3 . . . N, said steps including upgrading the reference air traffic control flight plan, when the flight directive of rank i is loaded in the flight management system by creating a new air traffic control flight plan version i, resulting from the updating of the reference air traffic control flight plan with said flight directive of rank i;

saving the air traffic control flight plan version i in the flight management system; and adding and displaying on said list of loaded flight directives, the flight directive of rank i indicating the corresponding state "loaded and valid" for said flight directive of rank i; and activating by a pilot the air traffic control flight plan version N then loading by the flight management system of the air traffic control flight plan on which the aircraft is slaved, wherein in case of at least one flight directive with rank j which is between 1 and N is considered invalid and has to be cancelled, applying the following steps:

initializing with the reference air traffic control flight plan;

upgrading the reference air traffic control flight plan when the flight directive of rank 1 is loaded in the flight management system by creating a new air traffic control flight plan version 1 resulting from the updating of the reference air traffic control flight plan with said flight directive of rank 1;

saving the air traffic control flight plan version 1 in the flight management system;

successively repeating the following steps upon receiving the flight directives of rank i=2, 3 . . . j−1, j+1, . . . N;

upgrading the reference air traffic control flight plan, when the flight directive of rank i is loaded in the flight management system by creating a new air traffic control flight plan version i resulting from the updating of the reference air traffic control flight plan with the said flight directive of rank i;

saving the air traffic control flight plan version i in the flight management system;

adding and displaying on said list of loaded flight directives, the flight directive of rank i indicating the corresponding state "loaded and valid" for said flight directive of rank i;

updating said list of loaded flight directives, the flight directive of rank j indicating the corresponding state "loaded and invalid then cancelled" for said flight directive of rank j; and activating by the pilot the air traffic control flight plan version N then loading by the flight management system into the active flight plan on which the aircraft is slaved.

2. The method according to claim 1, wherein the indication of the corresponding state "loaded" or "loaded and invalid then cancelled" is realized by ticking/unticking a box.

3. The method according to claim 1, wherein, when the flight directive has to be cancelled, said flight directive is erased by an associated erasure button.

4. A device for implementing the method according to claim 1, comprising components of said flight management system of the aircraft, wherein the flight management system includes a datalink component;

a flight plan component;

a database; and a man-machine interface component.

* * * * *